UNITED STATES PATENT OFFICE.

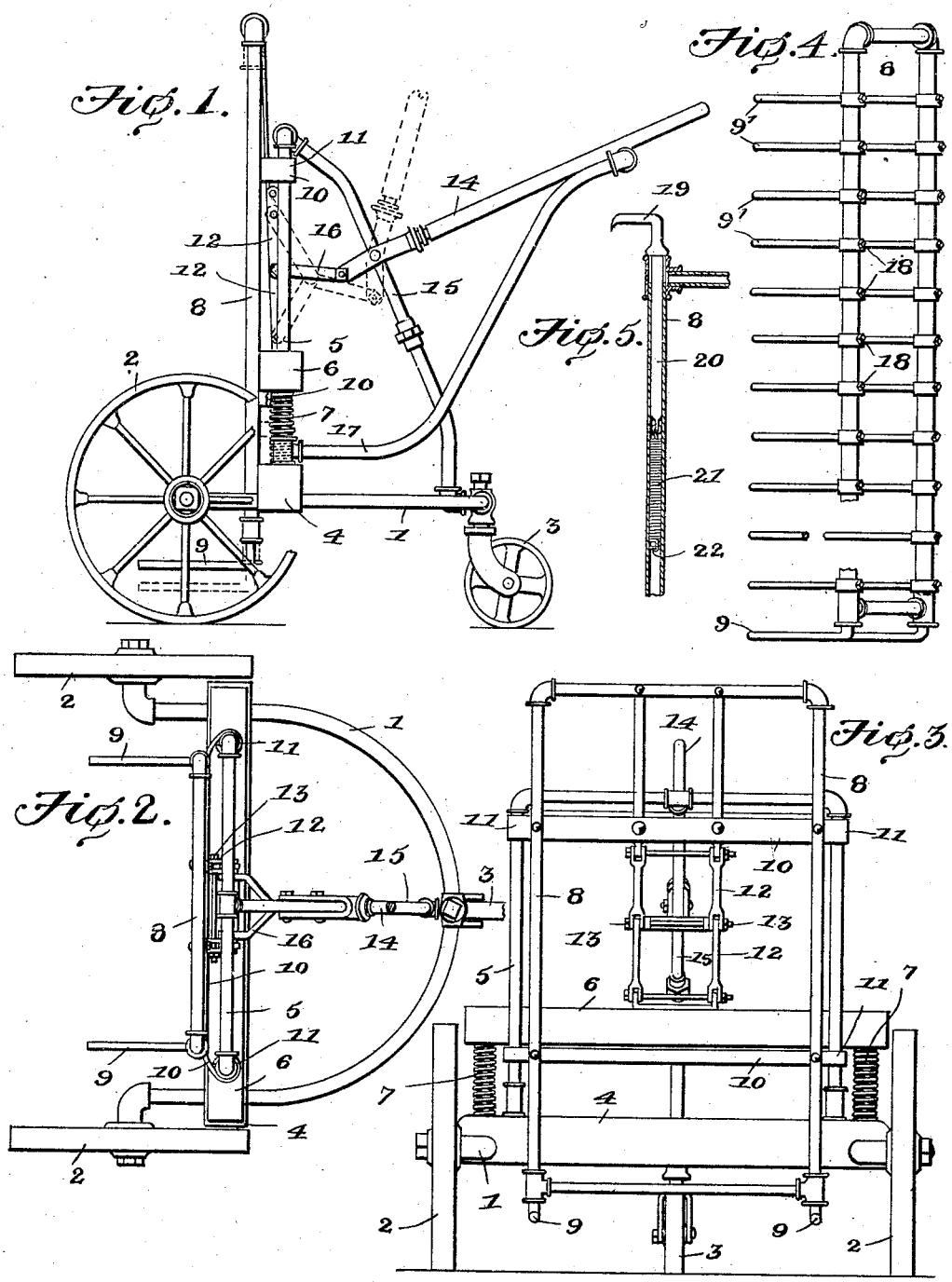

GEORGE BARNEY, OF LEESVILLE, LOUISIANA.

BRICK-TRUCK.

No. 857,859.  Specification of Letters Patent.  Patented June 25, 1907.

Application filed June 4, 1906. Serial No. 320,103.

*To all whom it may concern:*

Be it known that I, GEORGE BARNEY, a citizen of the United States, residing at Leesville, in the county of Vernon and State of Louisiana, have invented a new and useful Brick-Truck, of which the following is a specification.

This invention has relation to brick trucks and it consists in the novel construction and arrangement of its parts as hereinafter shown and described.

The object of the invention is to provide a truck adapted to be used to transport brick and similar articles in small quantities for short distances, especially is such a truck useful about the yards and places where such articles are manufactured.

The truck consists primarily of a frame mounted upon wheels and is provided with a suitable handle whereby the same may be manually propelled. Upon said frame is mounted a vertically adjustable frame and connecting the two said frames are a set of toggle joints which are adapted to be operated by a lever in such manner that the movable frame is vertically adjusted with relation to the wheel mounted frame, the load of brick or other articles having previously been placed upon said vertically adjustable frame. Interposed between the vertically adjustable frame and the wheel mounted frame is a set of springs so that the load carried by the truck is spring supported. The truck may also be equipped with attachments whereby the brick may be placed upon the truck upon pallets minus the usual supporting legs and also a gripping device may be provided for engaging the upper set of brick or pallet and retain the same against accidental tilting forward and falling from the truck as the same is being moved over the surface of the ground.

In the accompanying drawing:—Figure 1 is a side elevation of the brick truck with parts broken away. Fig. 2 is a top plan view of the brick truck with parts broken away. Fig. 3 is a front elevation of the brick truck. Fig. 4 is a perspective view of the adjustable frame of the truck showing the same provided with pallet supporting arms. Fig. 5 is a detail sectional view of a portion of the upper end of the frame showing a hook member adapted to engage the upper tier of brick or pallet.

The truck consists of a horizontally disposed U-shaped frame member 1. The wheels 2, 2 are journaled at the forward ends of said frame member 1 and the caster wheel 3 is pivotally attached to the intermediate portion of the said frame member 1. The cross-beam 4 is attached at its ends to the forward portions of the frame member 1. The said cross-beam is consequently located just behind the centers of the wheels 2, 2. The vertically positioned inverted U-shaped member 5 is attached at its ends to the cross-beam 4. Said frame member 5 has loosely mounted upon the same the cross-beam 6 which is adapted to move vertically but is retained in parallel relation with the cross-beam 4. The coil springs 7, 7 are interposed between the cross-beams 4 and 6. The vertically adjustable frame 8 is located in front of the frame member 5 and the said frame 8 is substantially rectangular in front elevation and is provided at its lower end with the horizontally extending parallel arms 9, 9. The cross-pieces 10, 10 connect the vertical sides of the said frame 8 together and are provided at their ends with the loops 11 which receive the frame member 5 and are adapted to slide vertically thereon. The toggle joints 12, 12 are pivotally attached to the cross-beam 6 and to the upper cross-piece 10 of the frame 8. The inner or meeting ends of the said toggle joints 12 are pivoted together as at 13 in the manner usually found in such joints.

The lever 14 is fulcrumed to the prop section 15 which extends in a rearwardly direction from the upper end of the frame 5 to the intermediate portion of the frame member 1. The working end of the said lever 14 is connected by means of the link 16 with the pivots 13 of the toggle joints 12. The handle member 17 is attached at its lower ends to any convenient part of the wheel mounted portion of the frame of the truck, preferably to the lower ends of the frame member 5. The said handle member 17 extends back and is of such convenient height as to permit the truck to be conveniently propelled by manual labor.

The operation of the truck is as follows:— The free end of the lever 14 is elevated as indicated by the dotted lines in Fig. 1. The link 16 is consequently drawn to the rear which pitches the toggle joints 12 at an angle to each other. As the upper ends of the set of said toggle joints are attached to the vertically movable frame 8, the said frame descends as the free end of the lever 14 is elevated. The arms 9, 9 are then slipped under a pile of brick or other material to be moved. The free end of the lever 14 is then swung down against the upper edge of the propelling handle 17 when the toggle joints 12 are forced into vertical alinement by the link 16. This movement elevates the frame 8 which in turn carries up the load. As the cross-beam 6 is supported on the cross-beam 4 by means of the interposed coil springs 7, 7, the entire load carried by the truck rests upon the said spring 7. Consequently a spring load supporting truck is provided. The form of frame 8 as shown in Fig. 4 of the drawing is provided with a series of horizontally extending arms 9', 9'. The said arms are attached at proper elevations along the frame 8 by means of the set screws 18. The said arms 9' are adapted to support pallets that are not provided with legs. Upon the said pallets the brick is placed.

By reference to Fig. 5, it will be seen that the upper corner of the frame 8 is provided with a hook 19. The shank 20 of the said hook extends down into the upright portion of the said frame 8 and the spring 21 is attached at one end to the shank 20 of the hook 19 and at its other end to the cross-pins 22 located in the upright portion of the frame 8. The said hook may be elevated and caught over the top tier of brick or the top pallet supporting such a tier. The tension of the spring 21 is such as to have a tendency to retain the said hook 19 in the lowest possible position with relation to the said frame 8. Consequently the engagement of the said hook with the load carried by the truck will have a tendency to prevent the load from tilting forward should the truck be passed over uneven ground.

Having described my invention, what I claim as new and desire to secure by Letters Patent is:—

1. A truck such as described consisting of a horizontally disposed U-shaped frame member, wheels journaled at the ends of said member, a caster pivotally attached at the intermediate portion of said member, a vertically extending frame member, a brace connecting the upper end of said vertical member with the rear end of said horizontal member, a handle member suitably attached to the frame members, and a vertically adjustable frame guided by the vertically extending frame member, and means for moving said adjustable frame.

2. A truck such as described consisting of a horizontally disposed U-shaped frame member, wheels journaled at the ends of said member, a caster pivotally attached at an intermediate portion of said member, a cross-beam connecting the forward portions of said horizontal member together, a vertically extending frame member erected from said cross-beam, a member connecting the upper end of said vertical member with the rear end of said horizontal member, a handle member suitably attached to the frame, a vertically movable frame slidably attached to said vertically extending frame member, and means for moving said movable frame.

3. A truck such as described consisting of a horizontally disposed U-shaped frame member, wheels journaled at the forward ends of said member, a caster pivoted at the intermediate point of said member, a cross-beam located near the forward end of said member, a vertically extending member erected from said cross-beam, a second cross-beam slidably mounted on said vertically extending frame member, and being adapted to move in parallel relation with the first said cross-beam, coil springs interposed between said cross-beams, a load supporting frame attached to the spring supported cross-beam, a lever fulcrumed to the frame members, toggle joints pivotally connecting the spring supported cross-beam with the load supporting frame, said lever being operatively connected with said toggle joint.

In testimony that I claim the foregoing as my own, I have hereto affixed my signature in the presence of two witnesses.

GEORGE BARNEY.

Witnesses:
T. A. GRISWOLD,
COLUMBUS PITRE.